(12) United States Patent
Liekens et al.

(10) Patent No.: US 10,187,276 B2
(45) Date of Patent: Jan. 22, 2019

(54) NETWORKING DEVICE ADAPTED FOR USE AS A GATEWAY FOR A LOCAL NETWORK, AND ASSOCIATED METHOD

(75) Inventors: Werner Liekens, Sint Katelijne Waver (BE); Luc Vermoesen, Bornem (BE); Jourik De Loof, Aartselaar (BE)

(73) Assignee: ALCATEL LUCENT, Murray Hill, NJ (US)

( * ) Notice: Subject to any disclaimer, the term of this patent is extended or adjusted under 35 U.S.C. 154(b) by 99 days.

(21) Appl. No.: 13/980,416

(22) PCT Filed: Feb. 6, 2012

(86) PCT No.: PCT/EP2012/051949
§ 371 (c)(1),
(2), (4) Date: Aug. 9, 2013

(87) PCT Pub. No.: WO2012/107394
PCT Pub. Date: Aug. 16, 2012

(65) Prior Publication Data
US 2013/0311656 A1    Nov. 21, 2013

(30) Foreign Application Priority Data
Feb. 11, 2011   (EP) .................................... 11305147

(51) Int. Cl.
*G06F 15/173* (2006.01)
*H04L 12/26* (2006.01)
(Continued)

(52) U.S. Cl.
CPC ........ *H04L 43/065* (2013.01); *H04L 12/2834* (2013.01); *H04L 41/046* (2013.01);
(Continued)

(58) Field of Classification Search
CPC ........... H04N 21/43615; H04N 21/658; H04L 65/1069; H04L 12/2803; H04L 67/025;
(Continued)

(56) References Cited

U.S. PATENT DOCUMENTS

2003/0017823 A1* 1/2003 Mager ..................... H04M 1/22
455/414.1
2005/0114496 A1* 5/2005 Fang et al. .................... 709/224
(Continued)

FOREIGN PATENT DOCUMENTS

| CN | 101385317 A | 3/2009 |
| CN | 201707672 U | 1/2011 |
| WO | WO-2007089895 A1 | 8/2007 |

OTHER PUBLICATIONS

International Search Report PCT/ISA/210 for International Application No. PCT/EP2012/051949 dated Feb. 6, 2012.

*Primary Examiner* — Dustin Nguyen
*Assistant Examiner* — Hao H Nguyen
(74) *Attorney, Agent, or Firm* — Harness Dickey & Pierce P.L.C.

(57) ABSTRACT

A networking device for use as a gateway for a local network is configured to be remotely managed by a remote management protocol. The networking device includes a controller configured to detect whether the networking device is taking part in a remote management protocol session, and an indicator configured to indicate whether the networking device is taking part in a remote management protocol session, being controlled by the controller.

11 Claims, 1 Drawing Sheet

(51) Int. Cl.
*H04L 12/24* (2006.01)
*H04L 29/08* (2006.01)
*H04L 12/28* (2006.01)

(52) U.S. Cl.
CPC ............ *H04L 67/125* (2013.01); *H04L 67/14* (2013.01); *H04L 67/36* (2013.01)

(58) Field of Classification Search
CPC ..... H04L 41/0813; H04L 43/04; H04L 43/10; H04L 65/1033; H04L 29/12254; H04L 41/0681; H04L 67/36; H04L 41/046; H04L 67/14; H04L 12/2834; H04L 41/0803; H04L 41/22; H04L 43/045; H04L 43/065; H04L 43/0811; H04L 43/0817; H04L 43/103; G06F 11/3055; G06F 11/325
USPC ............. 709/204, 224, 225; 455/414.1, 566; 710/16, 220, 316; 715/772
See application file for complete search history.

(56) References Cited

U.S. PATENT DOCUMENTS

| | | | |
|---|---|---|---|
| 2006/0020353 A1* | 1/2006 | Gonzales | G05B 19/042 700/86 |
| 2007/0220093 A1* | 9/2007 | Bracke et al. | 709/204 |
| 2008/0256471 A1 | 10/2008 | Okamoto | |
| 2009/0259792 A1* | 10/2009 | Matsunaga | G06F 3/023 710/316 |
| 2010/0088432 A1* | 4/2010 | Itoh | G06F 11/325 710/16 |
| 2011/0078352 A1* | 3/2011 | Williamson et al. | 710/220 |
| 2011/0320998 A1* | 12/2011 | Perry | G06F 17/50 716/122 |
| 2012/0242495 A1* | 9/2012 | Aguirre | G08B 5/36 340/815.45 |
| 2014/0279463 A1* | 9/2014 | Pederson | G06Q 20/145 705/40 |

* cited by examiner

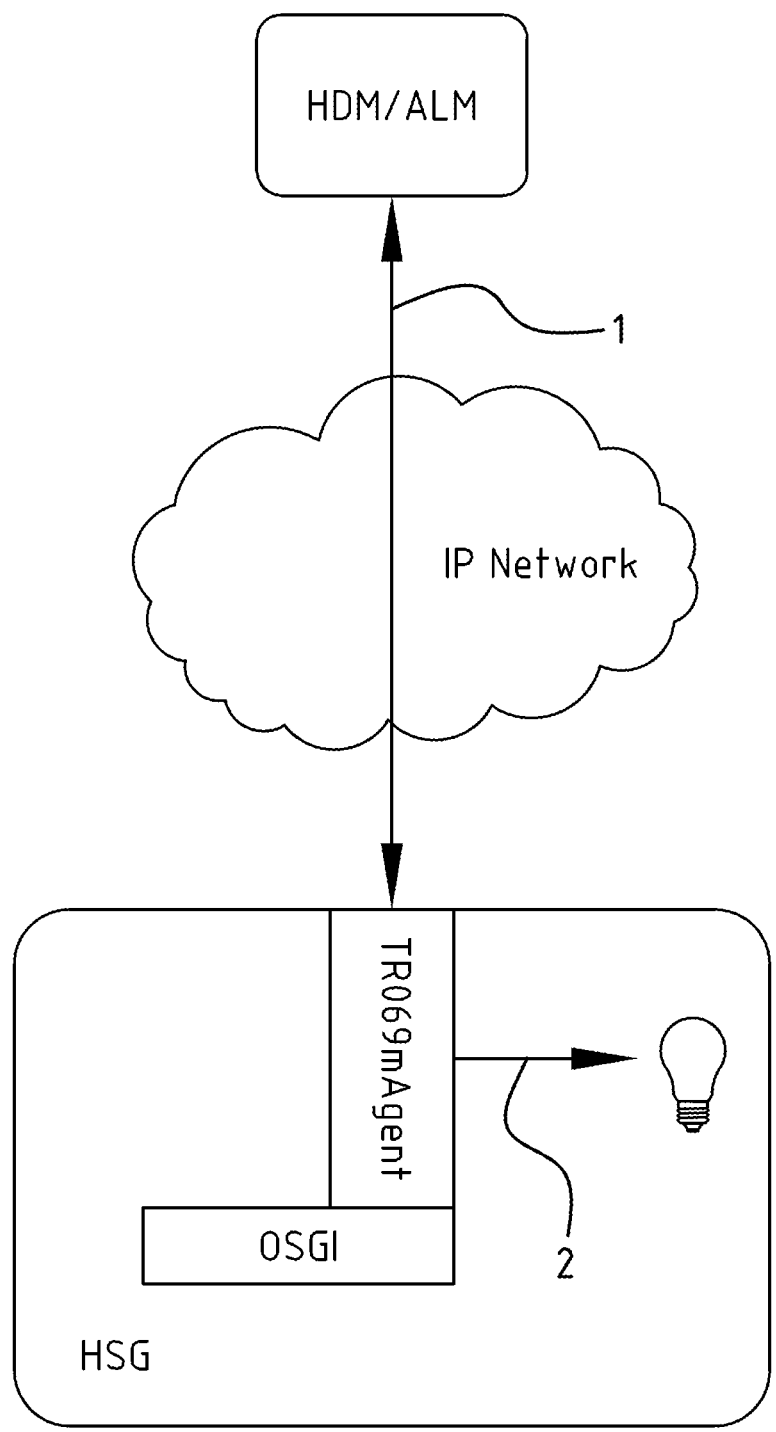

NETWORKING DEVICE ADAPTED FOR USE AS A GATEWAY FOR A LOCAL NETWORK, AND ASSOCIATED METHOD

This application is the national phase under 35 U.S.C. § 371 of PCT International Application No. PCT/EP2012/051949 which has an International filing date of Feb. 6, 2012, which claims priority to European patent application number EPSN 11305147.8 filed Feb. 11, 2011; the entire contents of each of which are hereby incorporated by reference.

TECHNICAL FIELD OF THE INVENTION

The present invention relates to the field of a networking device adapted for use as a gateway for a local network, and to an associated method.

BACKGROUND OF THE INVENTION

Home service gateways or home sensor gateways are network elements which typically form the gateway between a local network, e.g. a home network, and the access network. Today these gateways are capable of being remotely managed by means of a remote management protocol as for instance TR-069.

When a user who tries to physically install a home service gateway (HSG) at home, and encounters a problem in doing so, this may be caused by a failure in the setup of a remote management session between the automatic configuration server (ACS) and the HSG. Today the installer has to contact the operator in order to identify the problem, which is a burden.

SUMMARY OF THE INVENTION

It is an objective of the present disclosure to disclose a home network server which guides a installer in the detection of problems during the installation process.

According to the present disclosure, the above defined objective is realized by a networking device according to embodiments of the present invention, the networking device being adapted for use as a gateway for a local network, the local network being adapted for being remotely managed by means of a remote management protocol, wherein the networking device comprises a controller for detecting whether the networking device is taking part in a remote management protocol session, and an indicator controlled by the controller for indicating whether the networking device is taking part in a remote management protocol session.

By detecting the participation of the HSG in a remote management protocol session, and indicating the participation of no participation status by an indicator, the user who is installing the HSG is directly informed about a possible failure as to this respect. He is thereby guided in detecting which type of problems are occurring during the installation process. The simple detection of the participation of the HSG in a remote management protocol session may take away the need to contact the operator, e.g. by phone. Contacting the operator can be extremely burdensome for the customer, which is often guided through option menus and/or is put in waiting queues.

The indicator can be any means which allows the user to be directly informed about the status. Preferably the indicator is a visual indicator. It can for instance be a light source. It can be a lamp or LED or similar type of light source.

According to preferred embodiments, the the indicator is positioned on the outside of said networking device. It can for instance be provided in or on the outside of the housing of the HSG, such that it can be seen by a user/installer.

According to preferred embodiment of the present invention, the indicator does not comprise a display. Many CPE's do comprise a display which can display a variety of information, but this is typically not present or required for home gateway devices.

According to preferred embodiments of the present invention, the controller is embodied as a remote management protocol agent running on an OSGI platform. It can be embodied for instance as a TR-069 management agent running on an OSGI platform.

According to preferred embodiments, the indicator comprises at least one lighting device which is capable of emitting light, and the lighting device comprising at least two emitting states. The two emitting states can for instance vary in intensity or color. A first emitting state can for instance be a non-emitting state, while a second emitting state can be a brightly emitting state, such that the difference between two emitting states can easily be recognised by a user. The lighting device may also be adapted for having more than two emitting states, for instance green—red—yellow, or dark—half intensity, full intensity.

According to preferred embodiments, the networking device comprises a plurality of lighting devices, each lighting device comprising at least two emission states. The emitting states can for each device be according to the description in the previous paragraph.

According to preferred embodiments, the controller is further adapted for identifying different states of the remote management protocol session, and for controlling the one or the plurality of lighting devices to correspond to the different states of the remote management protocol session by generating different emitting patterns for the different states. Some of the different states of the remote management protocol session can be for instance BOOT (or init), UP (or Connected, DOWN (or Disconnected). The different emitting patterns may be defined by using different emitting states of a single, or of a plurality of lighting devices. The different emitting patterns may correspond to a variation of light emission in time of the one or more lighting devices. For instance a pattern may be defined by the frequency of flickering of a single lighting device.

According to preferred embodiments, the indicator can be used to indicate another state of the networking device, the other state being not related to the participation in a remote management protocol session. One or more lighting devices may also be used to indicate other states of the networking device, as for instance main power on or off state, IP connectivity or not, etc. The controller can then be adapted for detecting these other states, and for controlling the indicator accordingly in order to indicate such other states.

According to preferred embodiments, the networking device is adapted for use with a remote management protocol being TR-069 as defined by the Broadband Forum.

According to preferred embodiments of the present invention, the remote management protocol session is one of a TR-069, SNMP or OMA-DM management session.

According to preferred embodiments, the controller is further adapted for receiving signalling instructions from a remote management server, the signalling instructions defining how the step of indicating whether the networking device is taking part in a remote management protocol session is to be indicated by the indicator.

According to preferred embodiments, the controller is adapted for communicating information describing the capabilities of the indicator to a remote management server.

A remote management server is hereby also described which is adapted for receiving information describing the capabilities of and indicator of a home service gateway and for signalling instructions to said HSG, the signalling instructions defining how the step of indicating whether the networking device is taking part in a remote management protocol session is to be indicated by the indicator, based on said capabilities.

According to a further aspect of the present invention, a method is disclosed for providing remote management protocol session information about a networking device to a user, comprising at the networking device:
  detecting whether the networking device is taking part in a remote management protocol session; and
  based on the detection, indicating whether the networking device is taking part in a remote management protocol session, by means of an indicator comprised in the networking device.

According to preferred embodiments, indicating comprises controlling the emission of light of at least one lighting device which is capable of emitting light, between at least two light emitting states.

According to preferred embodiments, indicating comprises controlling the emission of light of a plurality of lighting devices, each lighting device comprising at least two emittion states.

According to preferred embodiments, detecting comprises identifying different states of the remote management protocol session, and generating different emitting patterns by the one or the plurality of lighting devices corresponding to the different states of the remote management protocol session.

According to preferred embodiments, the method further comprises receiving signalling instructions from a remote management server by the controller, the signalling instructions defining how the step of indicating whether the networking device is taking part in a remote management protocol session is to be indicated by the indicator.

According to preferred embodiments, the method further comprises communicating information describing the capabilities of the indicator to a remote management server by the controller. The capabilities can for instance comprise how many LED are comprised in said indicator, and/or how many emitting states a/each LED can emit.

According to a further aspect of the present invention, a computer program is described comprising a code means adapted for performing the above described method, when performed on a networking device adapted for use as a local network gateway. A data storage means comprising such a computer program has also been disclosed.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

BRIEF DESCRIPTION OF THE DRAWINGS

The accompanying drawings are used to illustrate embodiments of the present invention.

FIG. 1 illustrates embodiments according to the present invention.

DESCRIPTION OF ILLUSTRATIVE EMBODIMENTS

The Broadband Forum is an international industry consortium of service providers, equipment and component manufacturers and other interested parties, focussing on developing multi-service broadband packet networking specifications addressing interoperability, architecture and management. The work enables home, business and converged broadband services, encompassing customer, access and backbone networks. More information about the Broadband Forum is available from its Internet site http://www-.broadband-forum.org/.

One of those technical specifications is the Broadband forum's Technical report TR-069 (e.g. issue 1, amendment 3, Issue Date: November 2010 Protocol Version: 1.2). The TR-069 Management Protocol and corresponding network architectures allow communication between a Customer Premises Equipment (CPE) and an automatic configuration server (ACS). It defines a mechanism that encompasses secure auto-configuration of a CPE and also incorporates other CPE management functions into a common framework.

Also other remote management protocols methods do exist, as for instance SNMP (Simple Network Management Protocol) and OMA-DM (Opan Mobile Alliance Device Management).

The description of aspects of the present invention is performed by means of particular embodiments and with reference to certain drawings but the invention is not limited thereto. Depicted figures are only schematic and should not be considered as limiting.

According to an example, illustrated in FIG. 1, a Home Service Gateway (HSG) being the gateway between a home network and an access network, is connected to an automatic configuration server over an IP based network. The automatic configuration server (1) can be for instance the remote management server defined in the framework of the TR-069 protocol. When the HSG establishes a TR-069 connection with the automatic configuration server (HDM (Home Device Manager)/ALM (application lifecycle management)), the TR-069 agent running in the HSG, for instance running on an OSGI platform, controls a management indication light which is positioned on the housing of the HSG in order to indicate that the management session is active (2). It can for instance cause a LED light to start flickering. The home service gateway can for instance comprise a dedicated LED, or can use a different emission pattern for a multi-purpose LED, in which different variations of emitting states of the LED correspond to different indicators. The installer can then easily be informed about the status of the network management session.

While some embodiments described herein include some but not other features included in other embodiments, combinations of features of different embodiments are meant to be within the scope of the invention, and form different embodiments, as would be understood by the skilled person.

The invention claimed is:

1. A networking device configured to be used as a gateway for a local network, said networking device configured to be remotely managed by a remote management protocol, said networking device comprising:
  a memory having computer-readable instructions stored therein;

a processor configured to execute the computer-readable instructions to detect participation of said networking device in a remote management protocol session relating to an installation process of the networking device; and an indicator including one or more light emitting diodes (LEDs) configured to indicate a status of said participation of said networking device in the remote management protocol session, said processor being further configured to execute the computer-readable instructions to, communicate information describing capabilities of said indicator to a remote management server, the information describing the capabilities of said indicator including at least a number of LEDs included in said indicator and a number of types of emitting states each LED of said indicator is capable of emitting, receive signaling instructions from the remote management server, said remote management server generating said signaling instructions based at least in part on said information describing the capabilities of said indicator communicated from the networking device, said signaling instructions defining how said indicator is to indicate said status of said participation of said networking device in the remote management protocol session such that the remote management server controls said indicator according to the number of LEDs and the number of types of emitting states of each LED, and identify different statuses of said participation of said networking device in the remote management protocol session, and generate different emitting patterns for one or more of the LEDs of said indicator to correspond to said identified different statuses, based on said signaling instructions received from the remote management server.

2. The networking device according to claim 1, wherein said indicator is positioned outside said networking device.

3. The networking device according to claim 1, wherein said processor is a remote management protocol agent running on an Open Services Gateway Initiative (OSGI) platform.

4. The networking device according to claim 1, wherein each LED is configured to emit light in at least two emitting states, and said at least two emitting states of each LED includes any one or more of (i) a non-light-emitting state and a light-emitting state, (ii) emitting light of at least a first color and a second color, (iii) emitting light with a low brightness intensity and a high brightness intensity, and (iv) emitting light with a slow flickering frequency and a fast flickering frequency.

5. The networking device according to claim 4, wherein said generating said different emitting patterns for said one or more of the LEDs of said indicator to correspond to said identified different statuses includes varying between different types of emitting states of said one or more of said LEDs of said indicator.

6. The networking device according to claim 1, wherein said processor is further configured to execute the computer-readable instructions to control said indicator to indicate one or more other statuses of said networking device, said one or more other statuses being unrelated to the remote management protocol session and relating to one or more of a power status and an IP connectivity status of the networking device.

7. The networking device according to claim 1, wherein said remote management protocol is one of Technical Report-069 (TR-069), Simple Network Management Protocol (SNMP) and Open Mobile Alliance-Device Management (OMA-DM).

8. A method for providing information about a remote management protocol session of a networking device to a user, the method comprising:

detecting participation of said networking device in a remote management protocol session relating to an installation process of the networking device;

indicating, based on said detecting, a status of said participation of said networking device in the remote management protocol session, via an indicator including one or more light emitting diodes (LEDs) positioned in said networking device;

communicating information describing capabilities of said indicator to a remote management server, the information describing the capabilities of said indicator including at least a number of LEDs included in said indicator and a number of types of emitting states each LED of said indicator is capable of emitting;

receiving signaling instructions from the remote management server, said remote management server generating said signaling instructions based at least in part on said information describing the capabilities of said indicator communicated from the networking device, said signaling instructions defining how said indicator is to indicate said status of said participation of said networking device in the remote management protocol session such that the remote management server controls said indicator according to the number of LEDs and the number of types of emitting states of each LED; and identifying different statuses of said participation of said networking device in the remote management protocol session, and generating different emitting patterns for one or more of the LEDs of said indicator to correspond to said identified different statuses, based on said signaling instructions received from the remote management server.

9. The method according to claim 8, wherein the generating said different emitting patterns for one or more of the LEDs of said indicator to correspond to said identified different statuses of said participation of said networking device in the remote management protocol session comprises controlling emission of light of said one or more of the LEDs of said indicator.

10. The method according to claim 8, wherein
said generating said different emitting patterns for said one or more of the LEDs of said indicator to correspond to said identified different statuses includes varying between different types of emitting states of one or more of said LEDs of said indicator.

11. The method according to claim 8, wherein the networking device is configured to be used as a local network gateway.

* * * * *